United States Patent [19]

Lein, Jr. et al.

[11] Patent Number: 4,582,859

[45] Date of Patent: Apr. 15, 1986

[54] PROCESS FOR PRODUCING AN EXPANDED SEED COPOLYMER AND PRODUCT THEREFROM

[75] Inventors: George M. Lein, Jr., North Wales; Thomas J. Howell, Langhorne; James H. Barrett, Feasterville, all of Pa.

[73] Assignee: Rohm and Haas Company, Philadelphia, Pa.

[21] Appl. No.: 557,699

[22] Filed: Dec. 2, 1983

[51] Int. Cl.⁴ .............................. C08J 9/16; C08J 9/22
[52] U.S. Cl. ....................................... 521/56; 521/37; 521/54; 521/58
[58] Field of Search ..................... 521/37, 56, 58, 54

[56] References Cited

U.S. PATENT DOCUMENTS

| | | |
|---|---|---|
| 3,332,890 | 7/1967 | Hatch ..................... 521/28 |
| 3,792,029 | 2/1974 | Roubinck et al. ................ 526/80 |
| 3,959,189 | 5/1976 | Kitamori .................... 525/308 |
| 3,991,017 | 11/1976 | Barrett et al. .................... 525/329.5 |
| 4,085,169 | 4/1978 | Saito et al. ................... 525/309 |
| 4,091,054 | 5/1978 | Saito et al. ................... 525/309 |
| 4,173,688 | 11/1979 | Saito et al. ................... 521/56 |
| 4,419,245 | 12/1983 | Barrett et al. ................... 521/28 |

FOREIGN PATENT DOCUMENTS

| | | |
|---|---|---|
| 890463 | 1/1972 | Canada . |
| 1117287 | 2/1982 | Canada . |
| 1139775 | 1/1983 | Canada . |
| 932125 | 7/1963 | United Kingdom ............ 521/56 |
| 1416405 | 12/1975 | United Kingdom . |
| 1418560 | 12/1975 | United Kingdom . |
| 1601979 | 11/1981 | United Kingdom . |

OTHER PUBLICATIONS

Translation—Rohm & Haas, of East German Patent Specification, No. 204,702, VEB Chemi-kombinat, Jul. 12, 1983.

Primary Examiner—Herbert S. Cockeram

[57] ABSTRACT

An improved process for the manufacture of crosslinked copolymer particles from seed particles by imbibing a monomer therein and polymerizing the same under controlled suspension conditions wherein said improvement comprises expanding the seed in staged or sequential steps of feeding lower levels of crosslinking monomers in the early stages and preferably higher levels of crosslinking monomers at later stages of polymerization.

14 Claims, 1 Drawing Figure

PROCESS FOR PRODUCING AN EXPANDED SEED COPOLYMER AND PRODUCT THEREFROM

The present invention relates to an improvement in the known process for the preparation of crosslinked copolymer particles by aqueous suspension polymerization of lightly crosslinked seed particles. The invention is particularly suited to the preparation of ethylenic or styrenic-based ion exchange copolymer beads utilizing a seed copolymer which is swollen by imbibition of either a styrenic or an ethylenic monomer or monomer mixture. In one preferred embodiment the monomer or monomer mixture used is fed in the form of an aqueous emulsion to the suspended seed. In another preferred embodiment the seed particles are prescreened to a uniform size resulting in a final product having uniform particle size.

BACKGROUND OF THE INVENTION

Essentially all ion exchange resins are presently produced from crosslinked copolymer particles or "beads" by chemically treating the same to attach or form functional groups therein having a capacity for ion exchange. Thus, copolymer beads provide the strong, insoluble and rigid substrate for carrying ion exchange functional groups. From a standpoint of durability and hydraulic characteristics, an ion exchange resin is no better than the crosslinked copolymer from which it is derived. Highly porous copolymer particles without functional groups (herein termed "macroreticular" or "macroporous" polymer) are also useful as adsorbents for removing organic materials from fluid mixtures thereof and are intended to be embraced within the meaning of "ion exchange copolymer particles".

As used herein, the terms "functionalize", "functionalized" or "functionalization" are intended to describe the known prior art of chemically treating an insoluble crosslinked copolymer bead to attach an ion exchange group (functional group) thereto. The copolymer bead serves as the backbone polymer, whereas the ion exchange moiety is the active or "functional" site capable of exchanging ions with a surrounding fluid medium. Of the strongly acidic cation exchange resins, the sulfonic acid resin formed by sulfonating a copolymer (e.g., with sulfuric acid) is perhaps best known in the art. Weakly acidic cation exchange resins are normally derived from crosslinked acrylic copolymers by merely hydrolyzing the copolymer to form carboxylic cation exchange groups. Chloromethylation and amination of styrenic copolymers will result in weakly basic anion resins or strongly basic anion resins. Methods of performing suspension polymerization of ion exchange copolymers and of functionalizing the same to ion exchange resins can be found in the prior art and, in particular, reference is made to U.S. Pat. No. 4,224,415, which reference is hereby incorporated herein by reference.

Historically ion exchange copolymers have been formed by a batch process using a kettle reactor for monomer droplet formation and polymerization of an aqueous suspension of said monomer droplets. The monomer droplets are formed and maintained in a suspension by use of a mechanical agitator in the kettle. As might be expected, mild agitation forms monomer droplets (and eventually copolymer beads) of relatively large size while vigorous agitation yields smaller droplets. In either event, agitation of this type invariably leads to beads having a wide distribution of copolymer particle sizes. Ion exchange resins derived from copolymers of widely differing sizes are, in turn, of widely differing sizes. For many applications the wide distribution of bead sizes is not a major problem. For other applications it is desirable to have uniform bead sizes.

To accommodate those uses where narrow distribution of resin size is preferable, most manufacturers mechanically screen either the copolymer beads or the ultimate ion exchange resins to eliminate "unders" and "overs", that is, fines and oversized beads. Unfortunately, it is difficult with present technology to screen wet beads, and drying of the beads is not otherwise required for most purposes. The loss of product yield is another reason militating against screening resin beads. Accordingly, there is a definite desire for a new commercial process to furnish uniformly sized copolymer beads that can be functionalized to have ion exchange properties.

The prior art discloses several methods of growing larger particles from smaller seed particles. Among these can be found methods for (1) growing styrenic or ethylenic polymer particles by feeding monomers into an aqueous suspension of particles having the same composition, (2) swelling of preformed styrenic polymers or copolymers with liquid monomers (in situ) followed by suspension polymerization of the swollen particles and (b 3) swelling of minute low molecular weight emulsion particles by inbibition of monomers (and optionally solvents) in the suspension.

Illustrative of the known techniques utilizing seed to grow larger particles under aqueous suspension conditions, is Canadian Patent No. 890,463 (Sekisui/1972). Specific examples show uncrosslinked polystyrene and styrene/acrylonitrile copolymers used as seed and styrene or styrene/methyl methacrylate as the imbibed monomers. Continuous or intermittent addition of monomers over a three to twelve-hour period is illustrated. The reference also teaches the requirement for an expanding agent (foaming agent). Crosslinked seed is not exemplified.

Further refinements of the process of feeding monomers to a suspended styrenic seed may be found in subsequent patents assigned to Sekisui Kagaku Kogyo Kabushiki Kaisha. Among these are UK No. 1,416,405 (1975); UK No. 1,418,560 (1975); U.S. Pat. No. 3,959,189 (1976); U.S. Pat. No. 4,085,169 (1978); and U.S. Pat. No. 4,091,054 (1978). These later references teach the use of screening techniques for the seed in order to produce a uniform styrenic bead and also variations in the techniques of adding the monomers and the catalyst mixtures. In one of the references ('560) the improvement involves placing the catalyst in a separate feed stream from the bulk of the monomer mixture and utilizing a solvent with the catalyst. Seed particles of polyethylene are swelled with styrene in another of the patented processes ('179). Although the various Sekisui patents disclose combinations of monomers in both the seed and the monomer mixtures and even allude to the use of crosslinkers, clearly none of the teachings describes a method for producing crosslinked styrenic or ethylenic copolymers utilizing a feed containing substantial amounts of crosslinker (as needed for ion exchange copolymer resins). In the examples of the references either the seed particle is a homopolymer of styrene, ethylene, or the like, or the monomer feed is comprised of a single monovinyl monomer, or both. As will be explained more fully hereinafter, the use of a polyethylenically unsaturated crosslinking monomer, especially in large amounts and highly reactive types (such as divinylbenzene), presents unusual and difficult problems in maintaining a suitable aqueous suspension.

Other techniques for imbibing monomers into a preformed suspension of particles include the formation of the so-called "hybrid" resins which are produced when absorbing the monomer mixture into the macropores of a macroreticular resin, thereby forming two discrete phases within a single particle bead (see e.g., U.S. Pat. No. 3,991,017). Unlike the Sekisui technique which comprises the growing of particles to larger size, the hybrid resins largely imbibe the monomers into voids or spaces within the particle as well as into the gel matrix of the particle itself and thereby limited swelling is normally accomplished. In order to imbibe a polyethylenically unsaturated crosslinking agent into a preformed liquid monomer mixture containing a monoethylenically unsaturated monomer and a crosslinker, a very carefully controlled suspension system is required (see U.S. Pat. No. 3,792,029). By this method monomer droplets are formed containing both a styrenic monomer and a crosslinking agent and thereafter an emulsion containing additional crosslinker is fed to the suspension to make up for the loss of the faster reacting crosslinker while balancing the stabilizer amount to prevent beads from agglomerating (coalescing). Although differing from the prior art techniques utilizing an initial suspension of seed particles, the process of the '029 patent recognizes many of the problems associated with avoiding a new population of fine particles when feeding monomers during polymerization.

A second group of prior art references teaches methods for imbibing monomers into preformed particles to swell the same, and subsequently polymerizing the swollen particles. U.S. Pat. No. 3,332,890 (1967) is an early reference showing the manufacture of "snake-cage" resins produced by imbibing monomers into a styrenic gel polymer to form a linear polymer within the crosslinked copolymer bead. The process involves soaking crosslinked copolymer beads with a monomer mixture and thereafter suspending and polymerizing the swollen beads. Other typical processes for swelling particles or beads prior to polymerization can be found in Romanian Patent No. 48091 (1967) and UK Patent No. 1,116,800 (1968). A variation wherein the monomers soaked into the bead comprise both mono- and divinyl monomers is illustrated in UK Patent No. 728,508 (1955). A so-called double polymerization process is taught in U.S. Pat. No. 2,960,480 (1960).

In more recent years investigators have shown the feasibility of growing larger particles from a seed under emulsion polymerization conditions. See for example U.S. Pat. Nos. 4,113,687 and 4,186,120 (also European patent application Nos. 3905 and 10,986, as well as UK Patent No. 1,527,312). By this emulsion process, growth of the particles is propagated by maintaining conditions such that molecular weights of the polymers remain low or by utilizing selected solvents which can swell the particles.

A copending patent application (U.S. Ser. No. 393,953, filed June 30, 1982, now U.S. Pat. No. 4,419,245) commonly assigned to the assignee of the present application generally teaches a process to produce crosslinked copolymers of high mechanical strength and preferably narrow particle size distribution by the gradual addition of monomers to a suspension of seed particles maintained under polymerization conditions. This process comprises: (a) forming an unprotected agitated suspension of lightly crosslinked styrenic or ethylenic copolymer seed particles in an aqueous phase; (b) feeding to said unprotected seed suspension at least one polyethylenically unsaturated styrenic or ethylenic crosslinking monomer and a monoethylenically unsaturated styrenic or ethylenic monomer, which monomers are imbibed by and swell the seed particles without agglomeration of the particles in the suspension system; (c) continuing the monomer addition to the suspension until the seed particles have imbibed an amount of monomer sufficient to swell the particles to the desired size (but insufficient to stress the particles to a point of fracturing upon subsequent functionalization or to cause particle agglomeration or the growth of a new fines population within the suspension); (d) terminating the polymerization subsequent to the feeding step when the imbibed monomers have been sufficiently polymerized (e.g., 95-99% polymerized); and (e) separating the resulting insoluble copolymer particles from the aqueous phase. The term "unprotected" means that the dispersion is largely free of the usual protective colloids. When the copolymer is to be used for ion exchange, the monomer mixture will normally contain mainly a monoethylenically unsaturated monomer (e.g., 98-80%) with the remainder crosslinking monomer. As used herein "monomer mixture" is intended to refer to combinations of different monomers whether physically admixed or not during addition to the seed particles.

SUMMARY OF THE INVENTION

The present invention involves the unexpected discovery that staged or sequential polymerization can be utilized to increase the degree of expansion of a seed copolymer, by comparison with the prior art seed processes. In particular, the process of the present invention is capable of exceeding the 20:1 previous seed expansion thought to be the highest level obtainable.

According to the invention, the first stage of polymerization is conducted with lightly crosslinked seed particles and a low level of crosslinking monomer in the feed which may be added batchwise, intermittently or continuously to the seed while maintaining the seed under polymerization conditions. In one aspect of the process, the first stage of polymerization is conducted with seed particles having a crosslinker content of 0.1% to 3% by weight crosslinker, preferably 0.1% to 1.5% by weight, and with a monomer feed having a low level of crosslinking monomer, preferably 0.1% to 3% by weight of said monomer.

Each copolymer seed or previously expanded seed has a "limited immediate expandability" which is intended herein to define the limits to which a monomer feed can be imbibed quickly into a given copolymer seed without the substantial nucleation of new particles. The crosslinked copolymers of the types described as included herein can generally imbibe between two to ten times their original weight of monomers of the same type, most frequently about four times their weight. As with the prior art seed process for manufacturing copolymers from seed, greater levels of feed, i.e., in excess of 4-6 times the weight of the seed, can generate stresses, and consequently brittleness, in the final copolymer beads. The limited immediate expandability is dependent not only on the copolymer type, but on the degree of crosslinking of the copolymer. More highly crosslinked copolymers are normally limited to lower levels of expansion and conversely lightly crosslinked polymers expand to a greater extent.

For optimum suspension stability and copolymer product quality, it has been found most desirable to stage the polymerizations, that is, complete a significant degree of polymerization in the first stage (added monomer at least 30% polymerized) before commencing the next stage of monomer addition.

Although we do not wish to be bound by any theory expressed herein, it appears necessary to form additional amounts of polymer before additional monomer can be imbibed into a seed that has once reached or approached its limited immediate expandability. Of course, when feeding monomer continuously to a seed suspended under polymerization conditions (with initiator present and temperature elevated), there is a continuous formation of new polymer (within the seed) which can imbibe, at least partially, any newly added monomer feed. If the limited immediate expandability of a suspended seed is exceeded by adding more monomer than can be imbibed, a secondary population of new particles will form and will remain in the suspension or agglomerate and possibly attach at the surface of the expanded seed particles. Both of these possibilites are considered undesirable.

When feeding a liquid monomer mixture (containing monovinyl and polyvinyl monomers) to suspended seed particles, it is obvious, in view of the foregoing, that the limited immediate expandability of the seed should not be exceeded. Further, to avoid formation of a new random population of particles, undesirable bead stress or agglomeration, no additional monomer mixture should be added until the originally imbibed feed is substantially polymerized. Many, if not an indefinte number of, sequential polymerizations may be accomplished, so long as there is an adequate, but not excessive polymerization period between addition of the monomers to allow for further polymerization. Subsequent stages of monomer addition should, again, limit the monomer feed to an amount which will not exceed the limited immediate expandability of the suspended seed.

Since the expandability of the seed particle is dependent upon the crosslinker content of the seed, the indefinite expansion is normally curtailed upon feeding substantial quantities of feed containing too high a crosslinker level. Within the range of about 3% to 7% crosslinker some limited expansion is possible, but substantial further growth is severely limited without using swelling solvents or the like to aid in seed expansion.

Most copolymer particles utilized as substrates for manufacturing ion exchange resins require higher crosslinker levels than those useful for unlimited staged expansion. For copolymers typically containing 3 to 20% crosslinker, polymerization by the present invention may be staged with lower levels of crosslinker, say 0.1 to 3% crosslinker, until the seed reaches one-tenth to one-half the desired copolymer weight; thereafter feeding higher levels of crosslinker in the final stage or stages. To illustrate, a 100 g expanded seed containing 2% crosslinker is fed, as a final stage, with 400 g of monomer feed containing 12% crosslinker to yield a total of 10% crosslinker in the final product.

As used herein the term "suspension" is intended in its broadest sense as understood by those skilled in this art. The term relates to the suspension of droplets or seed particles in a medium in which the former is insoluble. This may be accomplished by adding the monomers or particles with any additives such as initiators, to the suspending medium which contains a dispersing, emulsifying or suspending agent, such as, for instance, in the case of an aqueous suspending medium, a surfactant, soap, carboxymethyl cellulose, bentonite, calcium phosphates, or a magnesium silicate dispersion. Agitation is used in the suspension to cause contact between added monomer feed and the seed particles as well as facilitate heat transfer. The polymerized particles generally termed "beads" are separated from the suspending medium and further processed if desired. The term "expanded" as used herein is intended to define particles produced by the method of the invention under which seed particles are caused to imbibe monomers and expand to larger size and weight while subjected to polymerization conditions.

Both droplet collision and monomer diffusion through the aqueous dispersion medium are considered possible mechanisms for contacting monomer feed with the seed particles. In systems using the preferred emulsion feed, both of these mechanisms are believed to occur.

There are at least three important advantages which may be obtained in accordance with this invention over known prior art batch suspension copolymerization techniques. First, the particle size of the copolymer (and resultant functionalized ion exchange product) may be precisely controlled by the size (and size distribution) of the lightly crosslinked seed and the amount of monomers fed thereto, thus eliminating the need for much of the bead screening required by conventional processes. The second advantage is that large-scale reactors may be utilized effectively because the preferred gradual or intermittant monomer addition distributes the heat of polymerization over a long period of time (e.g., several hours) with only part of the unreacted monomer charge present at the point of critical heat load; conventional batch polymerizations are difficult to control in large reactors because the entire unreacted monomer charge is present at the point of maximum polymerization rate. And, finally, the resultant ion exchange products prepared by the aforementioned seed process have excellent physical stability properties, such as friability, resistance to osmotic shock and the like, compared to products from conventional batch copolymerization processes.

The ability to continuously or intermittently feed a fresh monomer to a preformed suspension of seed particles offers flexibility not previously obtainable by the conventional prior art batch kettle process. The ability to control the ratio of initial seed to imbibed monomer in a wide range offers significant economic advantages. Because the rapid exotherm of a batch process is not encountered, the cooling requirements for the kettle are not as stringent as in the past. In addition, agitator requirements are drastically reduced. The agitator is not essential to the formation of the initial dispersion but rather is used only to maintain sufficient motion for imbibition of the monomer droplets into the preformed crosslinked seed. In summary, the process of the invention allows the use of polymerization kettles of far less stringent cooling and agitation requirements and, therefore, of different size configuration than useful heretofore in this particular art.

A batch of copolymer produced by the prior art method can be "fractionated" into various size ranges, and each fraction can be utilized to produce product of a larger ultimate particle size by merely controlling the monomer imbibition step during polymerization.

DETAILED DESCRIPTION

The preformed crosslinked seed particles useful in the invention may be styrenic or ethylenic in essential composition, that is, the predominant monomer (the monovinyl monomer in the case of ion exchange particles) will either be styrenic or ethylenic. The crosslinker is a polyethylenically unsaturated monomer which again, may be either styrenic or ethylenic in essential composition; it is possible to imbibe styrenic monomers into ethylenic seed and vice versa. The effective amount of crosslinker used in the lightly crosslinked seed particles must be carefully controlled in order to achieve the desired degree of swelling in each stage of the process. The degree of crosslinking of the seed is an important, if not limiting factor controlling the amount of monomer that can be usefully imbibed in each stage.

The "styrenic" monoethylenically unsaturated monomers contemplated by the invention are those commonly used to produce ion exchange resins and adsorbents, that is, styrene and aliphatic and halogen-substituted styrene. Commercial grades of styrenic monomers may include mixtures of two or more species. Among the monoethylenically unsaturated styrenic monomers useful are styrene, ethylvinyl benzene, vinyl toluene, methyl styrene, vinylbenzylchloride and the various halogenated styrenes.

The "ethylenic" monoethylenically and polyethylenically unsaturated monomers which are suitable for use in the process are principally the acrylates, methacrylates and acrylic acids, acrylamides, methacrylamides, acrylonitriles, and the various vinyl halides and acetates, and mixtures thereof. Illustrative of the class of ethylenic monomers are methyl, ethyl, and butyl acrylate; methyl, ethyl, and butyl methacrylate; acrylonitrile; methacrylonitrile; acrylic and methacrylic acids, dimethylaminopropylmethacrylamide (DMAPMA), trimethylolpropanetrimethacrylate (TMPTMA), vinyl acetate, vinyl chloride, vinylidene chloride, and the like.

In conjunction with the various monomers mentioned above, there may also be used optimally other monoethylenically unsaturated comonomers such as dialkyl maleate, dialkyl fumarates, dialkyl crotonates, dialkyl itaconates, and dialkyl glutaconates.

Suitable polyunsaturated crosslinking monomers include the styrenic and ethylenic crosslinking compounds well-known as useful in the preparation of ion exchange resins. Included within this group are divinylbenzene, divinylpyridine, divinyltoluene, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N -methylene dimethacrylamide, N,N -methylene dimethacrylamide, N,N -ethylenediacrylamide, trivinylbenzene, and the polyvinyl ethers of glycol, glycerol, pentaerythritol, resorcinol, and the monothio and dithio derivatives of glycols. Particularly preferred crosslinking monomers include aromatic hydrocarbons, such as divinylbenzene and trivinylbenzene, and acrylates such as trimethylolpropanetrimethacrylate (TMPTMA).

Within the above broad classes of monounsaturated and polyunsaturated monomers there may be certain monomers which are not suitable for preparing copolymers which are intended for subsequent functionalization to certain ion exchange resins. To illustrate, certain polyunsaturated crosslinkers may cleave upon sulfonation and accordingly should not be used in making copolymers which are to be converted ultimately to strongly acidic cation exchange resins (by sulfonation). Such crosslinkers, however, may be useful for the preparation of anion exchange resins which are functionalized by chloromethylation and subsequent amination or quaternization. Those skilled in the art will readily understand the parameters for selecting monomers depending upon the ultimate use to be made of the copolymer beads.

The finding that lightly crosslinked seed particles can serve to grow larger particles without undue agglomeration or loss of bead integrity, is an important discovery in accordance with the present invention. The prior art kettle techniques for seed polymerization generally have begun with linear polymers rather than crosslinked polymers, and accordingly one might theorize that such technology could be extrapolated to the manufacture of crosslinked ion exchange copolymer beads. Experiments have proved, however, that the starting seed by the present process must be lightly crosslinked in order to avoid dispersion failure when the more reactive crosslinking monomer is added to the dispersion. In general, a crosslinker level of between about 0.1% and 3% by weight of the total copolymer seed is suitable. When using a divinyl crosslinker such as the ubiquitous divinylbenzene (DVB), the crosslinker level is generally 0.1% to 3% by weight, preferably 0.1% to 1.5%, and even more preferably 0.1% to 1% by weight. Polyethylenically unsaturated crosslinkers having 3 or more groups capable of crosslinking normally may be used at a lower level of crosslinker for satisfactory results. To illustrate, when using TMPTMA as a crosslinker, a preferred level would be between 0.1% and 2% by weight. The upper level of 3% for DVB would in most instances be too high for adequate imbibition of monomers. In the case of macroreticular or macroporous seed, higher levels of crosslinker are possible, up to about 6.0% by weight. In general, lower levels of crosslinker foster rapid imbibition of the monomer feed but tend to lead to greater "stickiness" of the dispersion and hence increase the possibility of dispersion failure. Higher levels of crosslinker in the seed will tend to limit the overall swelling capacity of the seed and concurrently the rate and capacity for imbibition of the monomer feed.

The unsuitability of a completely uncrosslinked polymer seed in accordance with the prior art method for seed polymerization (e.g., Sekisui, et al) has been demonstrated by repeated experimentation. The following example illustrates an attempt to practice the prior art styrenic seed polymerization in the manufacture of a styrenic ion exchange copolymer. All parts are by weight unless otherwise indicated.

Prior Art Example

Reactor

A 2-liter laboratory resin kettle (4"×11") equipped with a dropping funnel, nitrogen inlet, heating mantle, thermocouple, condenser, and agitator was used for all experiments; the agitator had a metal shaft fitted with 6 crossbars (0.5"×2") and a three-bladed pitched impeller at the bottom.

Formulation

Initial runs were meant to evaluate a prior art process with the sole modification being the presence of crosslinker (DVB) in the monomer feed. A brief summary of the formulation follows:

(a) aqueous/organic=1.2
(b) % DVB in monomer feed=9.5
(c) monomer/seed weight ratio=85/15
(d) % TCP (total) in aqueous=0.5
(e) % BPO in monomer feed=0.5

Polystyrene seed (−40+50 mesh) was used in all experiments. The abbreviation "TCP" means tricalcium phosphate, a suspension stabilizer. The abbreviation "BPO" means benzoyl peroxide, a polymerization initiator.

A stock TCP slurry was prepared in the following manner:

33 grams of TCP were slowly added to 67 ml of deionized water in a blender; additional water was added to increase fluidity until a final TCP concentration of 16% resulted. Thereafter 0.5 ml of an alkyl sulfate surfactant was added with blending for an additional 15 minutes. Charges for a typical run were:

Styrene: 316 g
DVB: (55%) 66 g
BPO: 1.9 g
Polystyrene Seed: 67.5 g
TCP Slurry (16%): 2×8.0 g
Deionized Water: 550 g
Alkyl Sulfonate (surfactant): 3 ml

PROCEDURE

The water was added to the reactor, followed by the first TCP charge, and the polystyrene seed. The agitator was set at 490–500 rpm, after which the nitrogen sweep was started and the batch heated to 85° C. over 15–30 minutes. The surfactant was then added. Fifteen minutes later the monomer feed containing the initiator was started by dropwise addition using the following schedule:

1st hour: 80 ml
2nd hour: 95 ml
3rd hour: 115 ml
4th hour: 134 ml

At the end of the monomer addition, the second TCP charge was added. The batch was then held at 80°–85° C. for 3 hours, followed by a one-hour cure at 95° C. After cooling the batch, 25 ml of concentrated nitric acid (HNO$_3$) was added to dissolve the TCP. The resultant polymer was then washed and dried.

RESULTS AND DISCUSSION

Table I below presents a summary of six experiments involving a crosslinkable monomer feed with polystyrene seed; also included in the table is a control experiment involving no DVB crosslinker, i.e., the standard prior art process for linear polystyrene.

The presence of crosslinker in the monomer feed was responsible for dispersion failure occurring half way through the monomer addition (Experiments 1-3); the "stickiness" of swollen crosslinkable seeds apparently exceeded the protection provided by the TCP stabilizer. Increased amounts of TCP (Experiments 4-5) improved the situation somewhat, but dispersion failure was merely delayed until after the monomer addition; increasing the rate of monomer addition (Experiment 6) was also of no substantial help. Since a control run (Experiment 7) with no crosslinker ran smoothly, it must be concluded that the experimental procedure (equipment, raw materials, etc.) was not at fault but that the TCP/polystyrene seed system is not suitable for this type of crosslinkable monomer feed.

Another important discovery leading to the improved process of this invention is the finding that the seed polymerization is most effectively performed using a suspension system quite unlike those previously used for aqueous suspension of copolymer droplets. In a typical batch kettle process it has been conventional to utilize (1) protective colloids, (2) dispersants, and (3) surfactants.

TABLE I

| LAB-SCALE POLYMERIZATIONS WITH POLYSTYRENE SEED | | | | | | | |
|---|---|---|---|---|---|---|---|
| Expt. No.: | 1 | 2 | 3 | 4 | 5[a] | 6[b] | 7[c] |
| Monomer/Seed ratio: | 85/15 | 85/15 | 85/16 | 85/15 | 67/33 | 85/15 | 85/15 |
| TCP Slurry (g): | | | | | | | |
| (a) initial | 8 | 8 | 8[d] | 13[d] | 13[d] | 13[d] | 9[d] |
| (b) during feed | — | — | — | 3 × 4.5 | — | 2 × 9 | — |
| (c) after feed | — | — | — | 9 | — | — | 9 |
| Polym. Temp. (°C.) | 80 | 85 | 80 | 80 | 80 | 80 | 80 |
| Dispersion Failure (% monomer added): | 50 | 40 | 50 | During 80° hold | During 80° hold | 50 | None |

[a]Only 191 g. of monomer mix used; 2 hr. addition.
[b]Monomer feed rate increased by 50%.
[c]Control: no DVB in feed (all-styrene).
[d]Slurry subjected to sonic bath before charging.

The purpose of the protective colloids is to prevent droplets from coalescing once formed and provide some dispersant characteristics. Illustrative of the commonly used protective colloids are film-forming polymeric materials such as gelatin, polyvinyl alcohol, and various cellulosics. Dispersants are normally used in an aqueous suspension to promote the formation of new droplets and reduce the power input required by the agitator to form droplet population. Such dispersants are usually not emulsifiers. Polymeric materials such as PADMAC and Acrysols are conventionally used as dispersants. The purpose of a surfactant (emulsifier) is to emulsify the particles and accordingly is more typically a necessary additive for emulsion polymerization rather than suspension polymerization. The surfactants which are most frequently used include soaps and low molecular weight detergents such as those sold under the Triton brand (trademark of Rohm and Haas Company), and other materials well known to the emulsion polymerization art.

Protective colloids are to be minimized or avoided by the present invention because they tend to prevent the seed from imbibing the monomer feed during polymerization. Although dispersants are generally not needed for the present process, they may be used, especially under circumstances where the monomer feed is not in an emulsion form. Where an emulsion monomer feed is used, and such is a preferred embodiment of the invention, it is essential that a surfactant be utilized in the feed and preferably also in the initial suspension.

Among the specific surfactants which may be used to prevent sticking during feeding of the monomer are: sodium lauryl sulfate, sodium dodecyl benzene sulfonates, Triton X405 or 100, saponified coconut or tallow fatty acids and any other soaps normally used for emulsion polymerization. For a nonemulsified feed, calcium phosphates and other conventional prior art stabilizers may also be used.

In the prior art seed process for manufacturing polystyrene beads, inorganic stabilizers such as tricalcium phosphate are customarily used. Because of the stickiness encountered in the systems using a polyvinyl crosslinking monomer, tricalcium phosphate has been found to be entirely inadequate in stabilizing the suspension, especially under the low sheer conditions used in the present process. In combination with other more effective stabilizers, however, tricalcium phosphate may have some application to the present process. Protective colloids which form a film about the suspended particles can be, on the other hand, so effective at protecting the suspended droplets that they inhibit imbibition of the monomer into the seed and hence cannot be generally used by the present process. By contrast, the prior art aqueous suspension method for making crosslinked ion exchange copolymer invariably uses a protective colloid to prevent bead agglomeration.

In addition to the monomers, seed particles and suspension stabilizers, it is conventional to add polymerization initiators such as benzoyl peroxide (BPO) to the suspension. A desirable new class of catalysts and rate moderators for polymerization are described in U.S. Pat. Nos. 4,192,921; 4,246,386; and 4,283,499, and are also useful by the process.

Monomer feed to the preformed suspension of seed particles can be accomplished in various ways. The simplest technique is to mix the polyunsaturated crosslinking monomer with the monoethylenically unsaturated monomer (if any) in the desired proportions, together with a minor amount of polymerization initiator, and thereafter feed the monomer mixture dropwise, in a stream, continuously or intermittently. Some alternatives to this procedure include (a) separate feed of the crosslinking monomer and the monoethylenically unsaturated monomer, or (b) separately metered feeding of the two monomers to an in-line mixing device whereby the relative ratios can be varied to accommodate particular desired polymerization conditions. As the prior art suggests, it is sometimes more desirable for bead homogeneity to feed a higher amount of the more reactive polyunsaturated monomer at a later stage of polymerization (See e.g. U.S. Pat. No. 3,792,029 issued Feb. 12, 1974).

A preferred method for feeding the initiated mono unsaturated monomer/crosslinker mixture involves preparing an aqueous emulsion thereof together with a suitable emulsifier (and optionally other ingredients) and metering this mixture to the suspended seed. Excellent results have been obtained when feeding a preemulsified, initiated styrene/DVB mixture containing 0.1–100% DVB to a lightly crosslinked styrenic seed. The emulsified feed containing 2–20% DVB is to be preferred and 3–12% most preferred. In most commercial ion exchange resin copolymers, at least about 3% DVB is the lower limit of acceptability in order to impart the desired strength and durability. For staged expansion of the seed lower crosslinker levels are preferred initially, followed by higher levels in a final stage or stages to give our overall crosslinker level equal to the desired end product. Longer periods of addition of monomers to a suspended seed tend to correspond with more effective crosslinking for a given amount of crosslinker added. Thus, for example, a styrenic resin with a given amount of crosslinker added over a two-hour feeding period would not appear to have the same level of crosslinker (under normal testing methods) as a copolymer made by adding the same feed over a five-hour period.

From a standpoint of practical economics of seed polymerization, it has been discovered that the most desirable ratios of monomer feed (monounsaturated monomer plus crosslinker) to the seed is about 2–20:1 when expanding seed in a single stage. Superior products have been produced at monomer feed to seed ratios of 2–10:1, and accordingly, such ratios are to be preferred herein. While a broad range of feed to seed ratios allows for a high level of control of particle size irrespective of the initial seed size, the extreme ends of the range do present more significant problems of controlling the polymerization. When the monomer feed exceeds about 4–5 times the weight of the original seed particles (assuming a typical seed made from 1% DVB crosslinker) the rate at which the seed will absorb new monomer may be decreased near the end of the feeding step. Accordingly, at the higher feed ratios it may be necessary to prolong polymerization or accept a higher level of fines in the final product. The fines result from the unwanted polymerization of the emulsion droplets before they can be imbibed by the seed particles.

The type and amount of crosslinker initially used for the seed can also have a bearing upon the quality of the final ion exchange resin derived from the copolymer. Even when agglomeration fails to occur during addition of the monomer feed, the resulting functionalized ion exchange resin produced from such product can have poor physical properties if the feed ratio has not been properly optimized. For any given monomers used to produce seed and the amounts thereof, the weight of monomer feed that can be imbibed without adverse effect to the final product, must be empirically determined. In general, however, with the preferred crosslinker content of about 0.5% to about 1.5% by weight of the seed, it is possible to add up to 4–5 times the weight of the seed of monomer feed in a single stage to produce a copolymer which is highly resistant to bead fracture and having very good other physical parameters including solids content and ion exchange capacity Monomer can be added to the suspended seed in a single stage over a period of 2–8 hours, with 3–6 hours being preferred and 3–5 hours most preferred. Suitable reaction temperatures are those conventionally used in the known kettle polymerization process, namely, 30°–90° C. with 70°–90° C. being preferred. Since the uptake of monomer feed by the seed particles appears to be very rapid, it is possible to add protective colloids to the aqueous phase of the dispersion within about 15 minutes after feeding is complete while polymerization is continuing in the kettle. If a protective colloid is used prior to that time, there is the possibility of creating a new population of small droplets which will appear in the product as fines.

The present staged seed process is useful for both gelular and porous copolymers using a variation of feed and seed components. Thus, with a crosslinked polystyrene seed a styrene feed can be imbibed without crosslinker being present (at least part of the feed) and later leached out of the crosslinked bead during or after final functionalization. Macroreticular (macroporous) resins are produced using organic solvents with the monomer feed or alternatively adding the solvent to the suspension prior to addition of the monomer feed. The general methods for making macroreticular resins are applicable to the present seed process (see, e.g., U.S. Pat. No. 4,224,415).

After all of the monomers are added to the suspended seed, it is desirable to hold the suspension under polymerization conditions (elevated temperature and agitation) for an additional period of time, such as one hour, to complete polymerization. A "chaser" catalyst may be desirable if a low-temperature initiator is used during polymerization and it is desired to finish off the product at an elevated temperature of about 95° C. or higher.

For optimum practical commercial results it is preferable to have as much seed in suspension within the kettle during feeding as possible, short of adversely affecting the suspension or the product. Where there is an excess of seed, poor agitation will result and, in extreme cases, separation of the seed from the aqueous phase may be observed. When an emulsion feed is used, the organic/water balance can be maintained by the composition of the emulsion. An emulsion monomer level as high as 60% is possible; however, a somewhat lower amount such as 50-55% is more desirable for a stable suspension.

Emulsion feed provides the following advantages:
(a) good control of distribution of feed (uniformity)
(b) improved physical contact between feed and seed
(c) reduced agitator power requirements
(d) improved kinetics of pick-up (swelling).

While uniform particle size of the final copolymer product is generally desirable, it is not an essential requirement for a suitable ion exchange product in all situations. Accordingly, it is possible to start the present process using a seed product having a wide distribution of particle sizes with the resultant product having a similar spread of particle sizes, although perhaps somewhat wider than the original seed. Prescreening of the seed particles offers a uniformity of final product sizes not heretofore obtainable directly out of the batch kettle, and accordingly is a dramatic advantage of the present invention.

The following table illustrates specific examples of the growth of seed particles using a monomer feed/seed ratio of 4/1. Copolymer beads were sulfonated to form cation exchange resins with further expansion of size due to the insertion of the sulfonate group. Seed particles were essentially round and sizes given are diameters of beads (in microns).

TABLE II

| Seed Size Microns (Mesh)* | | Volume Expanded (4×) Copolymer Size Microns (Mesh)* | | Sulfonated Product Size Microns (Mesh)* | |
|---|---|---|---|---|---|
| 840 | (20) | 1,400 | (14) | 2,000 | (10) |
| 590 | (30) | 1,000 | (18) | 1,450 | (14) |
| 420 | (40) | 720 | (25) | 1,000 | (18) |
| 300 | (50) | 500 | (35) | 720 | (25) |
| 210 | (70) | 360 | (45) | 520 | (35) |
| 150 | (100) | 250 | (60) | 360 | (45) |
| 75 | (200) | 125 | (120) | 180 | (80) |

*U.S. Standard Sieve Size.

Table II above illustrates the range of sizes which would be most typically employed in a single stage of seed polymerization technique disclosed herein. Smaller size particles and large size particles can also be utilized as seed with resulting expanded copolymer and resin size.

In those applications where uniformity of the final ion exchange resin product is not essential, it may be possible to prepare the seed particles and the final product in a series of steps performed in the same polymerization kettle. In such a staged growth process a monomer mixture containing crosslinker can first be charged to the kettle, dispersed into droplets by agitation and polymerized, utilizing only a portion of the kettle's capacity. Thereafter, after substantial polymerization of the seed particles, additional monomer can be fed to the kettle and imbibed by the seed. Because the seed is not screened to remove fines and oversized particles, the final product from the kettle has a wide distribution of sizes.

DESCRIPTION OF THE DRAWING

To further illustrate the seed expansion by the present process, reference is made to FIG. 1 appended hereto which is a graph showing the size distribution of a typical seed before expansion and after imbibition of monomers and polymerization. The graph is a qualitative schematic representation of the relative frequency of particle sizes in the indicated range determined by multiple screenings of the seed and expanded seed polymer beads and plotting the relative percentages by weight. The data for the curves were obtained from a single-stage suspension-produced seed having a normal distribution of particle sizes including fines and oversized particles.

As might be expected for seed produced in a batch suspension, the distribution curves of FIG. 1 define a "bell" distribution. When the seed was expanded, there was both a shift of the "bell" to larger particle sizes as well as a broadening of the "bell". In this particular instance the monomer feed/seed ratio was 4:1 which calculates to a bead diameter expansion of about 1.7 times the original bead diameter. This accounts for the broadening of the curve upon expansion. Except for a broader range of particle sizes, the expanded seed curve follows the general contour of the seed curve including the flare at either end indicating the presence of both large and fine sizes.

Figure 1:
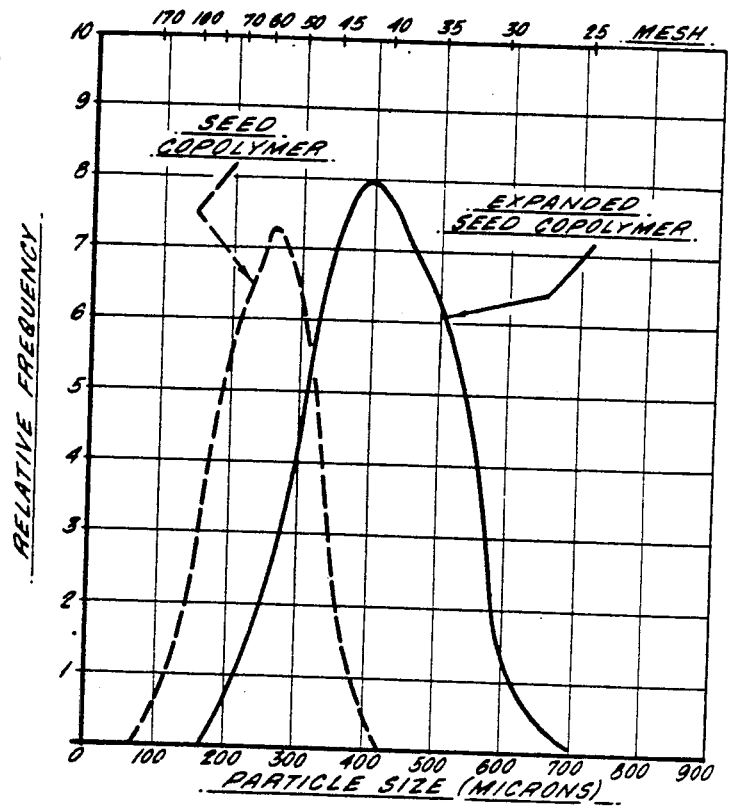

In certain ion exchange resin processes the convenience of uniformly sized particles produced directly in the kettle is highly significant. For example, in chromatagraphic sugar separation applications, resins of the prior art have been very expensive to manufacture because of the large yield losses suffered in screening copolymer in order to satisfy the narrow particle size distribution required (200–500 micron range vs. the 200–1,000 micron range typical of batch process products). The narrow particle size control which can be achieved in the seed process significantly reduces the cost of specialty resins of the aforementioned type resulting in a marketplace advantage.

The process of the present invention is illustrated with copolymers prepared and functionalized in accordance with the following general synthetic methods for both copolymer production and functionalization (sulfonation/cation, amination/anion).

SYNTHETIC METHOD

Copolymer Synthesis Procedure

The copolymers were prepared in 1.5–2.0 liter resin kettles (6–8 crossbars with turbine impeller) at 300–400 rpm. The preformed seed charge and a portion of the water/emulsifier charge were added to the reactor and heated to reaction temperature (65°–90° C.) under an inert atmosphere with stirring. The initiated monomer mix was deaerated, emulsified, stirring as needed, and fed subsurface over a 3–5 hour period. Between stages, polymerization was continued for 0–3 hours before beginning the next stage. After completion of the final monomer feed, the reaction mixture was held at temperature for 30–240 minutes and then heated to 95° C. for a 1–2 hour finish-off. The copolymer beads were then washed and air-dried prior to functionalization.

| Raw Material Charges (typical) Initial Suspension | |
|---|---|
| Deionized H$_2$O | 200–250 g |
| Triton QS-44 (10% active)* | 25 g (10% active) |
| Seed (screened/preformed) | 20 g |

| Initial Feed Mixture (typical) | |
|---|---|
| Deionized H$_2$O | 54 g |
| Triton QS-44 (10% active)* | 6 g |
| Styrene monomer | 78.5 g |
| DVB (55% active) monomer | 1.5 g |
| Benzoyl Peroxide (initiator/BPO) | 0.2 g |

*pH adjusted to 7.0–7.5/Triton QS-44 is a Rohm and Haas Company trademark for a surfactant.

| Final Feed Mixture (Typical for 10% Crosslinker) | |
|---|---|
| Deionized H$_2$O | 270 g |
| Triton QS-44 (10% active) | 30 g |
| Styrene Monomer | 321 g |
| DVB (55% active) monomer | 79 g |
| Benzoyl Peroxide (initiator) | 1.0 g |

Sulfonation (Cation Exchanger) Procedure

The air-dried copolymer is sulfonated in a 1-liter, 3-necked, round bottom flask equipped with stirrer, dropping funnel, condenser, and thermometer. Heat is supplied by a heating mantle and regulated by a Thermowatch/potlifter apparatus. The sulfuric acid is charged first, followed by the copolymer, then the EDC. The mixture is heated to 130° C. over a three-hour period with stirring. After being held at 130° C. for one hour, the mixture is cooled to 120° C. and water is added at such a rate to maintain the bulk temperature <125° C. Water is then added rapidly with stirring interspersed with siphoning to remove the buildup of wash liquors until the washes are clear. The hydrated resin is then neutralized with 50% caustic added over 30 minutes followed by 30 minutes stirring. The resin is batch-washed to remove excess caustic and drained to remove excess water.

| Raw Material Charge (typical) | |
|---|---|
| H$_2$SO$_4$ (96%) | 505 g |
| Copolymer (air-dried) | 100 g |
| Ethylene dichloride (EDC) | 35 g |
| H$_2$O | |
| (a) hydration | 1500–2000 g |
| (b) neutralization | 1000–1500 g |
| 50% NaOH | 100 g |

Chloromethylation Procedure

One mole of copolymer was swollen with 4 moles of chloromethylmethylether (CME) and then a solution of AlCl$_3$ (0.6–0.8 mole) in CME (75 ml) was added to the stirred mixture over a 2–4 hour period (cooling to maintain 20° C.). The mixture was then held at 20°–25° C. for 2–4 hours after the AlCl$_3$ addition; the excess CME was then destroyed by a water quench while maintaining the temperature below 25° C.

Amination Procedure (Anion Exchanger)

One mole of chloromethylated intermediate was slurried with water and the mixture made basic (pH 13) with 50% NaOH. Anhydrous trimethylamine, TMA (1.5 moles), was then added through a gas dispersion tube over a 1–2 hour period, cooling to maintain 0°–5° C. Upon completion of the TMA add, the mixture was held near room temperature for 8–12 hours, followed by a heatup to 100° C. to remove excess TMA. The resin was then washed with water and isolated for analysis.

Table III below summarizes a number of examples conducted by the foregoing methods: various ranges of monomer feed/seed ratio, seed crosslinker (DVB) level, monomer mix crosslinker (DVB) level, seed size, reaction temperature, initiator concentration, and addition time are illustrated. Samples with an asterisk indicate that emulsified monomer mix was used; in the other cases, the monomer mix was added neat.

Following the general procedure and apparatus disclosed above under "Synthetic Method", a number of styrene-divinylbenzene seed particles were expanded with the indicated styrene-divinylbenzene feed mixtures.

EXAMPLE I

To a two-liter reaction flask was added 20 g of seed (1% crosslinked, −80, +100 mesh), 225 ml of deionized water and 25 ml of 10% Triton QS-44 (pH of QS-44≈7.5). The mixture was stirred at 300–350 rpm and heated to 70° C. with a nitrogen sweep and held at 70° C. for one-half hour. The sweep was then changed to a static nitrogen blanket and 10 ml of a solution of paranitrosophenol (PNP) in 4% NaOH (conc.=1 mg/ml) was added via syringe. An emulsion containing 54 ml of deionized water, 6 ml 10% Triton QS-44, and 80 g of monomer (1% divinylbenzene, 0.375% tert-butyl peroctoate, remainder styrene), was then added over 4 hours. The monomer had been deoxygenated by sparging for 15 minutes with nitrogen before emulsifying. Additional 5 ml aliquots of the PNP solution were added at 1, 2 and 3 hours after addition commenced. After completion of addition the suspension was held at 70° C. for 2 hours and then 10 ml of a second PNP solution (conc.=2 mg/ml) were added. An emulsion containing 270 ml of deionized water, 30 ml of 10% Triton QS-44 and 400 g of monomer (10% DVB, 0.36% tBP, remainder styrene) was then added over 4 hours and 4 minutes. The monomer had been deaerated as above. Additional 5 ml aliquots of PNP solution were added at 1, 2, and 3 hours after addition began. After completion of addition the suspension was held at 70° C. for 4 hours, cooled to ambient temperature for 10 hours, and then heated to 95° C. for 1 hour; cooled, washed and dried to yield 485 g of material which was primarily beads of about 2.9–3.0 times the diameter of the original seed. These beads were sulfonated by a known method to produce acceptable ion exchange resins.

EXAMPLE II

To a 2-liter reaction flush were added 20 g of seed (1% crosslinked, −80, +100 mesh), 225 ml of deionized water and 25 ml 10% Triton QS-44 (pH of QS-44 7.5). The mixture was stirred at 300–350 rpm and heated to 85° C. with a nitrogen sweep, held for one-half hour at 85° C. with a $N_2$ sweep, and the sweep was changed to a blanket. An emulsion containing 54 ml of deionized water, 6 ml of 10% Triton QS-44 and 80 g of monomer (1% DVB, 0.25% BPO, remainder styrene) was added over 3 hours, 57 minutes. The monomer had been deaerated by sparging with nitrogen for 15 minutes prior to emulsifying. After addition the temperature was reduced to 84° C. and the reaction was held for 20 minutes. An emulsion containing 270 ml of deionized water, 30 ml of 10% Triton QS-44 and 400 g of deaerated monomer (10% DVB, 0.25% BPO, remainder styrene) was then added over 3 hours, 23 minutes. The reaction was held at 84° C. for 1 hour and then 95° C. for 1 hour, cooled, washed and dried to yield 473 g of beads which were swollen 2.9–3.0 times in diameter compared to the seed. These expanded-seed beads could then be functionalized to produce acceptable ion exchange resins.

Using the general procedures set forth above in Examples I and II, copolymer beads were prepared by staged expansion to yield useful products in accordance with the following:

TABLE III

| Example | Seed | 1st Feed | 2nd Feed | 3rd Feed |
|---|---|---|---|---|
| III | 20 g (1% DVB) | 80 g (3% DVB) | 400 g (10% DVB) | None |
| IV | 20 g (1% DVB) | 80 g (0.5% (DVB) | 400 g (10% DVB) | None |
| V | 20 g (1% DVB) | 80 g (3% DVB) | 400 g (10% DVB) | None |
| VI | 5 g (1% DVB) | 20 g (1% DVB) | 100 g (1% DVB) | 250 g (10% DVB) |

We claim:

1. An improved seed process for suspension polymerization to form crosslinked copolymers which comprises:
   (a) forming an agitated suspension of lightly crosslinked styrenic or ethylenic seed particles;
   (b) feeding to said suspended seed particles under polymerization conditions, but not in excess of the limited immediate expandability of said seed particles, of a monomer mixture containing at least 0.1% by weight of such mixture of one or more polyunsaturated crosslinking monomers with the remainder one or more monoethylenically unsaturated sytrene or ethylenic monomers, while balancing the suspension conditions and the feed, agitation and polymerization rates to avoid agglomeration until the seed particles have completed their expansion by uptake of the monomer mixture;
   (c) continuing polymerization until at least about 30% of the added monomer mixture has polymerized;
   (d) repeating steps (b) and (c) as desired;
   (e) feeding a final charge of polyunsaturated and monoethylenically unsaturated monomers under the conditions of (b) above to the expanded seed particles, the amount of polyunsaturated monomer in said final charge being sufficient to yield the desired level of crosslinking in the final copolymer particles, and providing that either the feed is suspended during the continued polymerization under (c) above or the percentage of crosslinking polyunsaturated monomer added in the final charge substantially exceeds that in the feed under (b) above, or both; and
   (f) finishing the polymerization and separating said final copolymer particles from the suspension medium.

2. The process of claim 1 wherein the seed particles and monomers are styrenic.

3. The process of claim 1 wherein the seed particles are crosslinked polystyrene and the monomers in the feed are predominantly styrene and divinylbenzene.

4. The process of claim 1 wherein the initial seed particles contain between 0.1% and 2% crosslinker.

5. The process of claim 1 wherein the monomer feed is emulsified in water and the suspension is an aqueous suspension.

6. The process of claim 1 wherein the final copolymer particles are functionalized with an ion exchange group.

7. The process of claim 3 wherein the initial seed particles contain between 0.1% and 2% by weight of divinylbenzene crosslinker.

8. The process of claim 3 wherein the initial seed particles consist of polystyrene crosslinked with between 0.1% and 1.5% by weight of divinylbenzene.

9. The process of claim 3 wherein the monomer mixture feed in the stages preceding the final monomer charge does not exceed ten times the weight of the seed particles prior to such stages.

10. The process of claim 3 wherein the final charge consists of monomer feed mixture having more than 3% by weight of divinylbenzene.

11. The process of claim 5 wherein the aqueous suspension comprises an effective amount of an aqueous-phase polymerization inhibitor.

12. The process of claim 11 wherein the aqueous-phase polymerization inhibitor is para-nitrosophenol.

13. The process of claim 11 wherein the effective amount of aqueous-phase polymerization inhibitor is about 0.1 g/liter, based on the total aqueous-phase volume.

14. The process of claim 11 wherein the polymerization is conducted in the presence of tert-butyl peroctoate as polymerization initiator.

* * * * *